US011428210B1

(12) United States Patent
 Can

(10) Patent No.: US 11,428,210 B1
(45) Date of Patent: Aug. 30, 2022

(54) DUCTED COUNTER-ROTATING WIND TURBINE

(71) Applicant: MEGABIZ PETROKIMYA ÜRÜNLERI SANAYI VE TICARET ANONIM ŞIRKETI, Bahcelievler/ Istanbul (TR)

(72) Inventor: Erdem Can, Bahcelievler/ Istanbul (TR)

(73) Assignee: MEGABIZ PETROKIMYA ÜRÜNLERI SANAYI VE TICARET ANONIM ŞIRKETI, Istanbul (TR)

( * ) Notice: Subject to any disclaimer, the term of this patent is extended or adjusted under 35 U.S.C. 154(b) by 0 days.

(21) Appl. No.: 17/351,242

(22) Filed: Jun. 18, 2021

(51) Int. Cl.
  *F03D 9/25*  (2016.01)
  *F03D 1/06*  (2006.01)
  *F03D 1/02*  (2006.01)
  *F03D 1/04*  (2006.01)
  *H02K 7/116* (2006.01)
  *H02K 7/18*  (2006.01)
  *F03D 15/00* (2016.01)

(52) U.S. Cl.
  CPC ............... *F03D 9/25* (2016.05); *F03D 1/02* (2013.01); *F03D 1/04* (2013.01); *F03D 1/0666* (2013.01); *F03D 15/00* (2016.05); *H02K 7/116* (2013.01); *H02K 7/183* (2013.01); *F05B 2240/211* (2013.01); *F05B 2240/37* (2020.08); *F05B 2260/70* (2013.01)

(58) Field of Classification Search
  CPC ... F03D 9/25; F03D 15/00; F03D 1/02; F03D 1/04; F03D 1/0666; H02K 7/116; H02K 7/183; F05B 2240/37; F05B 2240/211; F05B 2260/70
  See application file for complete search history.

(56) References Cited

U.S. PATENT DOCUMENTS

2014/0008915 A1 * 1/2014 Ribarov .................... F03D 9/25
  290/55

FOREIGN PATENT DOCUMENTS

GB         2430982 A  *  4/2007  ............. F03D 1/025

* cited by examiner

*Primary Examiner* — Viet P Nguyen
(74) *Attorney, Agent, or Firm* — Rahman LLC

(57) ABSTRACT

A wind energy harvesting machine with three counter-rotating rotors in a duct is disclosed. The wind energy harvesting machine includes a tower, a duct, a counter-rotating generator with two rotary parts, and three groups of blades. The duct includes supporting static stators in front and rear and a static nose cone in the front. The counter-rotating generator has a main shaft and rotary interior and exterior parts to rotating in opposite directions. Three rotary blade groups including front and rear blade groups rotatable around the main shaft in the same direction, and a middle blade group rotatable in an opposite direction. The front and rear blade groups are displaceable axially along the main shaft and the middle blade group is fixed on the exterior part of the counter-rotating generator.

14 Claims, 7 Drawing Sheets

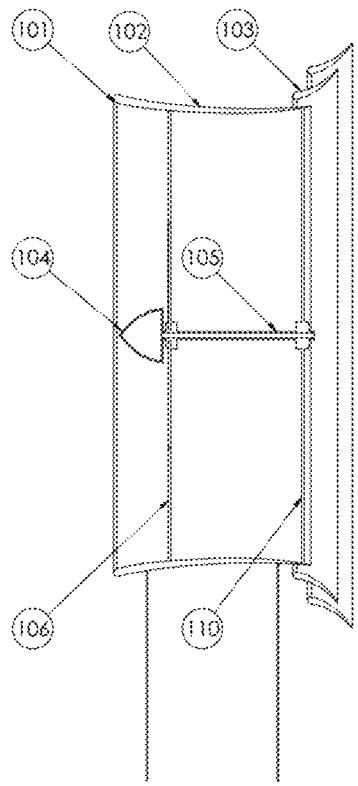
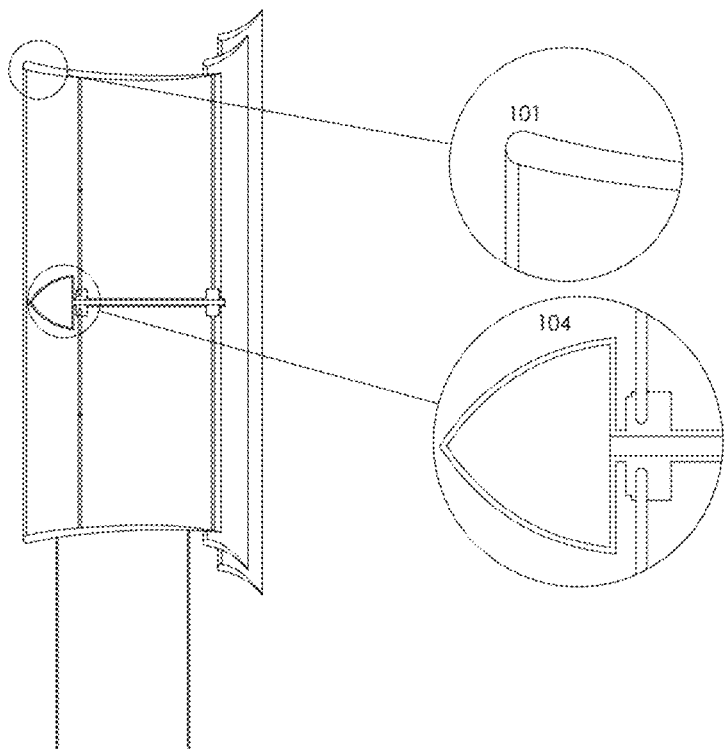
FIG. 2A
FIG. 2B
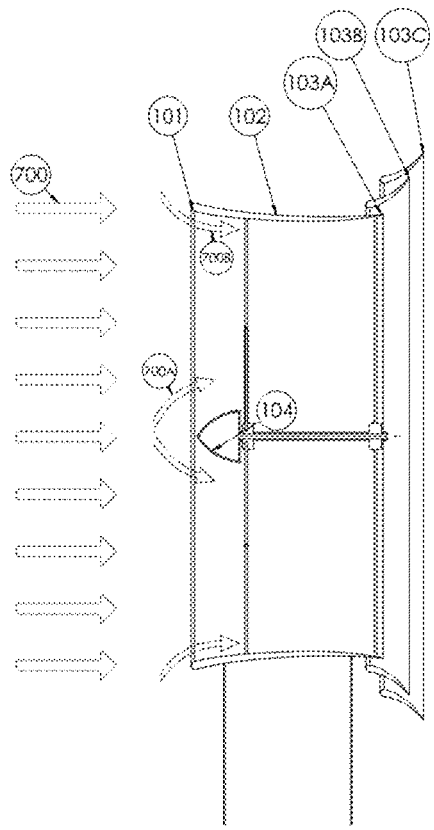
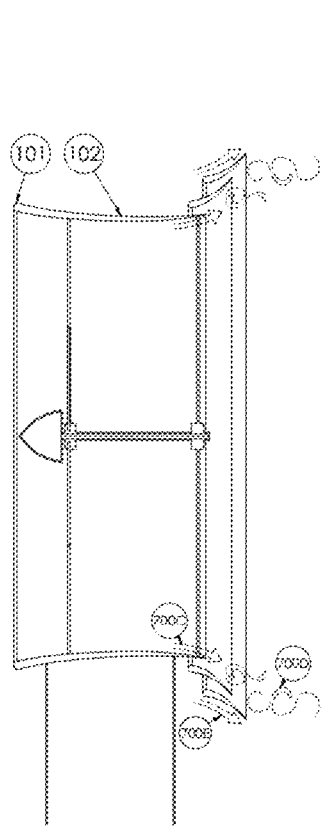
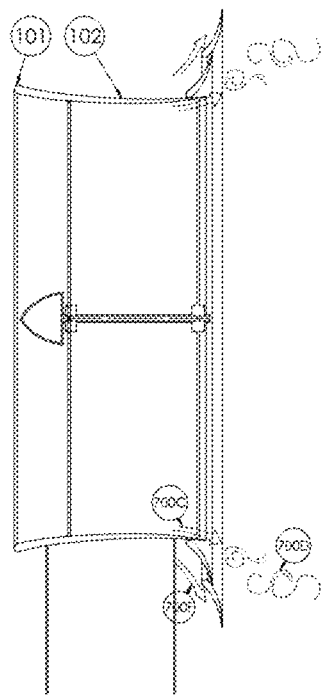
FIG. 3A
FIG. 3B
FIG. 3C

DUCTED COUNTER-ROTATING WIND TURBINE

FIELD

The present disclosure relates to renewable energy harvesting, particularly in the field of wind turbines that are incorporating a counter-rotating generator and rotors in a nozzle-diffuser duct assembly.

BACKGROUND

Today with the growth of energy usage, the importance of utilizing renewable energy is more apparent to industrial organizations than in the past. Conventional wind turbines include a tower, generator, and a rotor that comprises three long blades. Some conventional technology, due to aerodynamics limitations, harvest, at most, 59% of wind energy in ideal conditions. It is desirable to provide a more efficient wind turbine system. In the past two decades, two main concepts in this field have taken the focal point of concentration. Ducted wind turbines (DWTs) and counter-rotating wind turbines (CRWTs) are two methods to increase performance of traditional horizontal axis wind turbines (HAWT).

Ducted wind turbines include a duct encircling the swept area of rotors, which can be extended in a wind axis direction and can increase the aerodynamic efficiency. Ducts not only can increase the air velocity throughout the turbine rotor but can also reduce the pressure behind the turbine's blades. Also, compared with conventional wind turbines, counter-rotating wind turbines include a second, counter-rotating, turbine placed to take advantage of distributed air flow from a first rotating turbine. Counter-rotating turbines increase the power coefficient of horizontal axis wind turbines by producing electric energy in rotor and stator.

Newman developed the mathematical model for two rotary discs for wind turbines. Furthermore, Betz predicted that a single rotor can harvest 59% of wind energy, two rotors can trap 64% and three rotors can extract 66%. Betz and Newman neglected the vorticity and turbulent airflow behind the rotors and described the triangle of velocity in ideal conditions.

Based on Newton's third law of motion, whenever two objects are in static or quasi-static interaction, they exert equal and opposite forces or pressure on each other. For airfoils, the principle of this "action and reaction" helps to generate the pressure from an airfoil and the air deflects in the opposite direction of the blades. But behind the blades, the output airflow is susceptible to deviating from the wind axis direction. The airflow through these three stages of rotors creates a zigzag movement that helps the turbine system to decrease this deviated airflow and extract more and more energy from the wind.

U.S. Pat. No. 4,075,500 describes a duct with variable stator and diffuser for one rotor so that its stator can modify the attack angle of the airfoil in rotor blades.

In U.S. Pat. No. 2009/0097964 A1, a mixer ejector wind turbine was disclosed, which not only has a flared inlet but is also equipped with a ring of rotating blades in line with stator vanes. Based on this patent, rotating air streaming behind the rotor and high energy air passing through ejector are mixed to produce three or more times the power of an un-shrouded wind turbine.

Dual ducts are described in U.S. Pat. No. 2011/0037268 A1, which discloses counter-rotating propeller blades. Horizontal and vertical stabilizers connect the fore and aft ducts, and a vortex generator is included for flow attachment and is arranged for optimally trapping the wind energy.

In U.S. Pat. No. 2012/0256424 A1, wind energy can be harvested by use of an intake, bypass, and diffuser mechanism that permits an increased flow rate and pressure drop at the end of a diffuser augmented system.

In WO 2015/053640 A2, counter-rotating wind turbines are arranged in a duct in such a way that rotary blades can be pitched to gain a better angle of attack. The first rotor has a mechanism that is coupled to the inlet tunnel and the second rotor is connected to a diffuser so that a counter-rotating generator in the perimeter can produce more energy from the wind.

In U.S. Pat. No. 2017/0138337 A1, the optimal position of a single rotor in the duct was studied and a finding of 64% of duct length is disclosed.

Accordingly, it is desirable to provide a ducted, counter-rotating wind turbine that efficiently harvests wind energy.

SUMMARY

In one embodiment, the present disclosure exhibits a novel counter-rotating wind turbine that uses an active actuator in the duct that is operable with each of a plurality blade groups.

Duct

In the present disclosure, the duct has various tasks that distinguish its design. As a first aspect, the aerial structures disclosed herein have a chassis that carries the weight of all of the body of the duct. In an embodiment, the duct and connected tower not only maintain the whole turbine body in an elevated position but also keep all rotary components in a co-axial position. The duct has three main shrouded surfaces including a forward section. The chassis of the duct is equipped with a central shaft and two rows of static stators in front and rear positions that are fixed to the central shaft and extend radially to support the duct. In mid-size wind turbines, the size of a nose cone is considerable. The rotation of this huge part not only degrades the ideal aerodynamic performance but also increases the vibration of the rotary components. The present disclosure provides a non-rotary nose cone at an inlet part of the duct. The dimensions of this nose cone are in correspondence to dimensions of rotors and generators in order to lead the airflow in a suitable condition by way of a desired slope relative to nozzle slope.

In a second aspect, a forward part or section of the duct is shaped by airfoil that has a high lift characteristic. A shrouded surface of the duct channels the airflow into three groups of blades. The front part of the duct, static nose cone and the first group of stator blades with a suitable twist angle supply an optimal angle to the input wind stream. Similar to the front section of the duct, two active or fixed diffuser parts with flexible material are provided. The second group of stator blades with a suitable twist angle prepare an optimal angle to the output wind stream at the rear of the turbine incorporated with diffusers. Stator vanes of the fixed stators are rotatable about their own radial axis to alter the angles of attack thereof.

As a third aspect, due to a large number of rotary blades, security against probable occurrence of blades fracture is provided.

The duct of the present disclosure not only increases the flow rate and pressure drop at the rear of the last blades but also contributes to compressing outlet airflow from both the middle blades group and the rear blades group. As such, it is predictable that airflow accelerates through the blade's direction and the duct creates a high-pressure region in the top half of the blades.

The existence of two or three rotors with duct not only stores the wind energy in the rotary shaft and rotary parts of generator but also enhances the flow rate throughout these two or three rotary parts. In other words, the output stream behind each rotor that is influenced by rotational airflow affected by the duct, gives its energy to the counter-rotating generator and increases the turbine performance.

Counter-Rotating Generator

The present disclosure provides a generator with three main parts: a main shaft (which may be hollow), an inner rotary part, and an outer rotary part. The outer rotary part can be the "inducer" section or "induced" section and the inner rotary part can also be the "inducer" section or "induced" section. Independent of being inner and outer, the "inducer" part can include a permanent magnet or a temporary magnet.

Another aspect of the counter-rotating generator is a main hollow shaft that is co-axial with inner and outer rotary parts. This long hollow shaft with its supported bearings is mounted to the central shaft in the duct and provides the feasibility of axial displacement of front and rear blade groups. The hollow area of the generator shaft helps to cool the temperature of the generator by using a noble gas.

Three Hubs with Blades

At first glance, the counter-rotating wind turbine disclosed herein is a system with two degrees of freedom, but seven degrees of freedom can actually be visualized for all of the rotary components. A first rotary part is a hollow shaft in a generator that can smoothly revolve in a coaxial manner with three groups of blades. A second rotary part is a front blades hub that has two independent movement abilities. The front blades hub has two parts that can rotate relative to each other, whereas an interior part thereof has axial movement ability with a rack and pinion gear structure. A rear hub assembly is similar to a front hub and has two degrees of freedom. A different numbers of blades or a same number of blades as the front hub can be selected. The rotating ability of the outer part of the hubs facilitates a position change of two rows of blades. The position altering action can be influenced by wind speed variations. A middle hub is equipped with a linear actuator.

BRIEF DESCRIPTION OF THE DRAWINGS

The novel aspects and new advantages of this invention will become clear and understood as the drawings are disclosed, wherein:

FIG. 2A is a representation of a sectional view of duct and all of its components, in accordance with an embodiment.

FIG. 2B is a representation of a sectional view of the duct with emphasis on nose cone and nozzle geometry, in accordance with an embodiment.

FIG. 3A is a representation of a sectional view of duct and all of its components in presence of input wind direction, in accordance with an embodiment.

FIG. 3B is a representation of a sectional view of the duct and all of its components in presence of output airflow and turbulence output airflow in an open diffuser in accordance with an embodiment.

FIG. 3C is a representation of a sectional view of the duct and all of its components in presence of output airflow and turbulence output airflow in closed diffuser in accordance with an embodiment.

Figure 1:
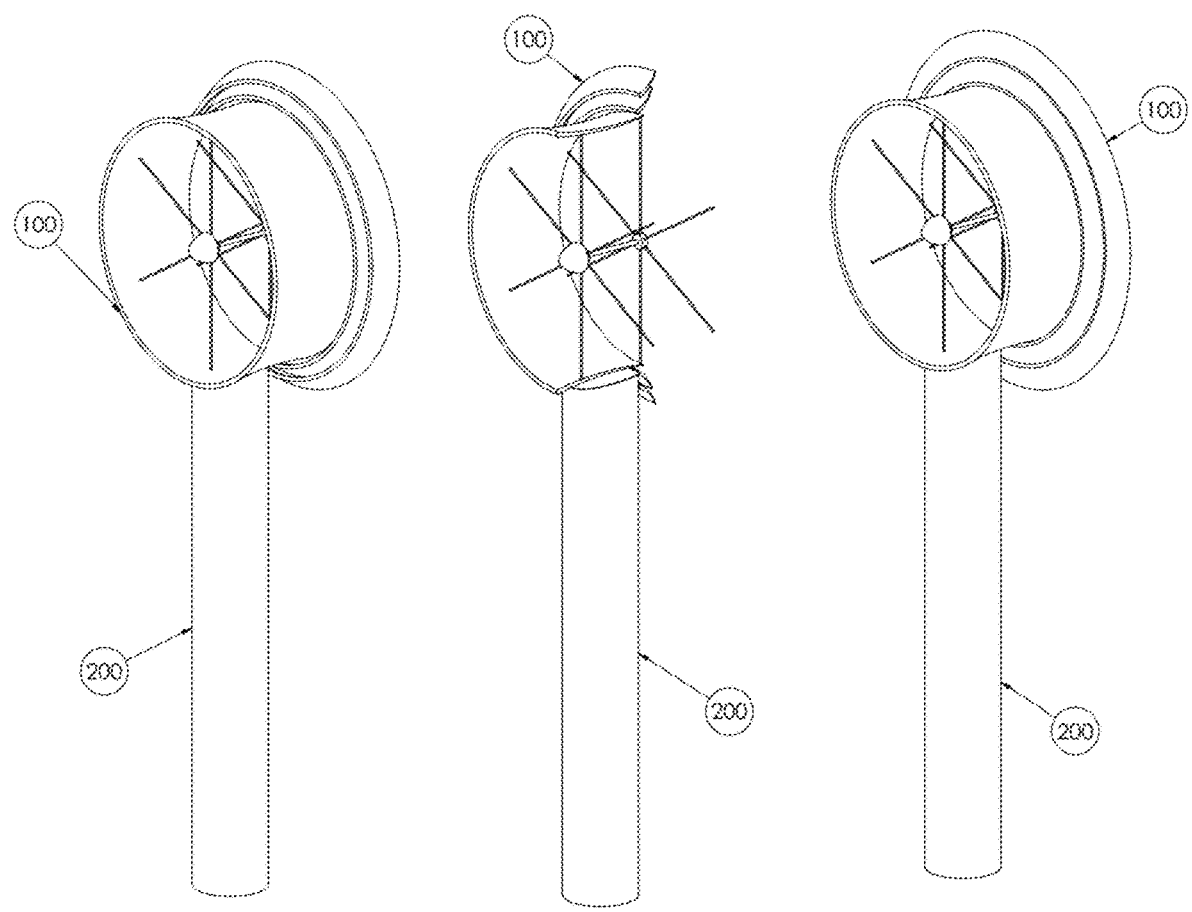
FIG. 1 is a representative three perspective view of duct and tower with active diffuser, in accordance with an embodiment.

100: Duct
101: High slope nozzle region of duct
102: Low slope region of duct
103: Active/fixed diffuser region of duct
103A: Fixed diffuser condition in the duct
103B: First active/fixed diffuser in the duct
103C: Second active/fixed diffuser in the duct
104: Non-rotary nose cone of duct
105: Fixed central shaft of duct
106: Front fixed stators group of duct
107: Front active stator group of duct
108: Front pinion bevel gear group of duct
109: Front bevel gear ring of duct
110: Rear fixed stators group of duct
111: Rear active stator group of duct
112: Rear pinion bevel gear group of duct
113: Rear bevel gear ring of duct
200: Tower
300: Front rows of blades
301: Outer ring of the front rows of blades
302: Outer gear ring of the front rows of blades 303: Planetary gear of the front rows of blades
304: Inner gear ring of the front rows of blades
305: Inner ring of the front rows of blades
306: Pinion gear of the front rows of blades
307: Blade of front rows of blades
400: Middle group of blades
401: the ring of the middle group of blades
402: Blade of the middle group of blades
500: Rear rows of blades
501: Outer ring of the rear rows of blades
502: Outer gear ring of the rear rows of blades
503: Planetary gear of the rear rows of blades
504: Inner gear ring of the rear rows of blades
505: Inner ring of the rear rows of blades
506: Pinion gear of the rear rows of blades
507: Blade of rear rows of blades
600: Counter-rotating generator
601: Hollow shaft of the counter-rotating generator
602: Front rack gear of the counter-rotating generator
603: Rear rack gear of the counter-rotating generator
604: Inner rotary part of the counter-rotating generator
605: Outer rotary part of the counter-rotating generator
700: Wind direction
700A: Compressed airflow of the wind
700B: Accelerated airflow of the wind
700C: Low-energy airflow of the wind
700D: Turbulent outlet airflow of the wind
700E: Low-speed outlet airflow of the wind
700F: High-speed outlet airflow of the wind

DETAILED DESCRIPTION

With reference to FIG. 1, an embodiment of the duct (100) and tower (200) of a counter-rotating wind turbine is depicted. In FIG. 2A, it is shown that an external surface of a duct (100) includes a low slope region of duct (102), a high slope nozzle region (101), and an active/fixed diffuser region (103). The high slope nozzle region converges toward a fixed central shaft (105) along a direction from a wind inlet end to a wind outlet end. The low slope region (102) is converging more gradually and/or having a constant throat cross-section. The diffuser region (105) diverges away from the fixed central shaft (105) along the direction from the wind inlet end to the wind outlet end. A chassis part of the duct (100) includes a fixed and non-rotary nose cone (104), the fixed central shaft (105), front fixed stators group (106) and rear fixed stators group (110). The front and rear fixed stators group (106, 110) include a plurality of stator vanes extending radially from the fixed central shaft (105) to an inner surface of the duct (100) in order to support the duct. The non-rotary nose cone (104) is mounted to a front end of the fixed central shaft (105)

FIG. 2B and FIG. 3A illustrate an interior section of the duct (100) with emphasis on the geometry of the high slope nozzle region (101) and the geometry of the non-rotary nose cone (104). These geometries are optimized with regard to hub diameters and blades characteristic in a way that compresses and accelerate the wind airflow (700A), (700B) in a highly efficient manner. With reference to FIG. 3B and FIG. 3C, the airflow leaves an outlet end (103A) of the fixed diffuser region (103) of the duct (100) by low energy airflow (700C) and enters a low-pressure region. A first active/fixed diffuser (103B) and a second active/fixed diffuser (103C) are electrically or manually regulated by a control system and accelerate the exterior airflow with low speed (700E) and high speed (700F). As such, a suction area is created whilst displacing the turbulent airflow (700D) a significant distance behind a rear group of blades (500). That is, the duct (100) includes the high slope nozzle region (101), the fixed diffuser region 103A and the low slope region axially intermediate the high slope nozzle region (101) and the fixed diffuser region (103A) that are fixed to one another and may be of a unitary construction. Further, one or more (e.g. first and second active diffusers 103B, 103C) active diffusers 103B, 103C are respectively rotatably mounted to the fixed diffuser region (103A) to allow an angle of divergence to be changed.

Figures 4A, 4B:
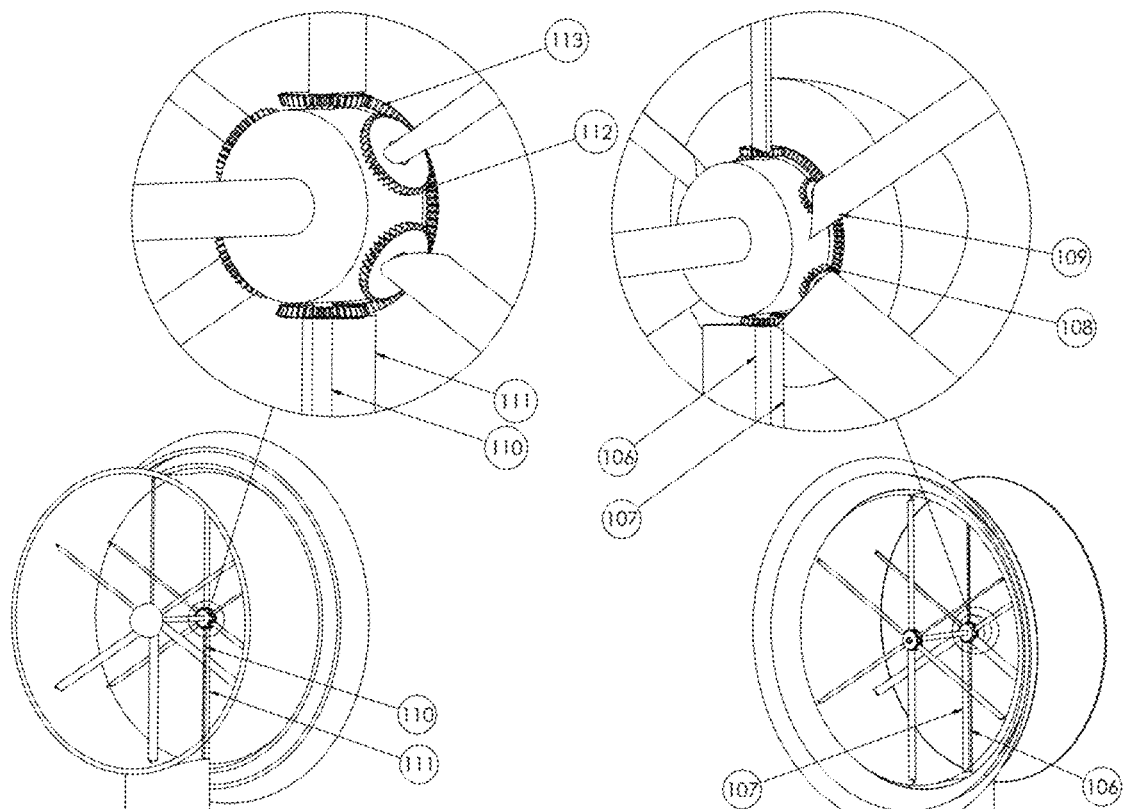
FIG. 4A is a representation of an isometric view of the duct and its active stators with an emphasis on rear stators, in accordance with an embodiment.
FIG. 4B is a representation of an isometric view of the duct and its active stators with an emphasis on front stators and nose cone, in accordance with an embodiment.

As shown in FIG. 4A, the rear active stator group (111) is supported by the rear fixed stator group (110) in a co-axial manner. The open and close condition of the first active/fixed diffuser (103B) and second active/fixed diffuser (103C) are strongly related to the rear active stator group (111) that are changed by rear pinion bevel gear group (112) and rear bevel gear ring (113).

The front active stator group (107) is supported by the front fixed stator group (106) in a co-axial manner as shown in FIG. 4B. These active stators (107) are shape optimized with regard to the front blades group and can change their attack angles with front pinion bevel gear group (108) and front bevel gear ring (109). That is, stator vanes of the front and the rear fixed stators group (106, 110) can be rotated about a radially extending axis thereof in order to relatively close or open a wind passage through the duct (100) at the inlet and outlet ends thereof, optionally by way of bevel gear or other gearing arrangements.

Figure 5:
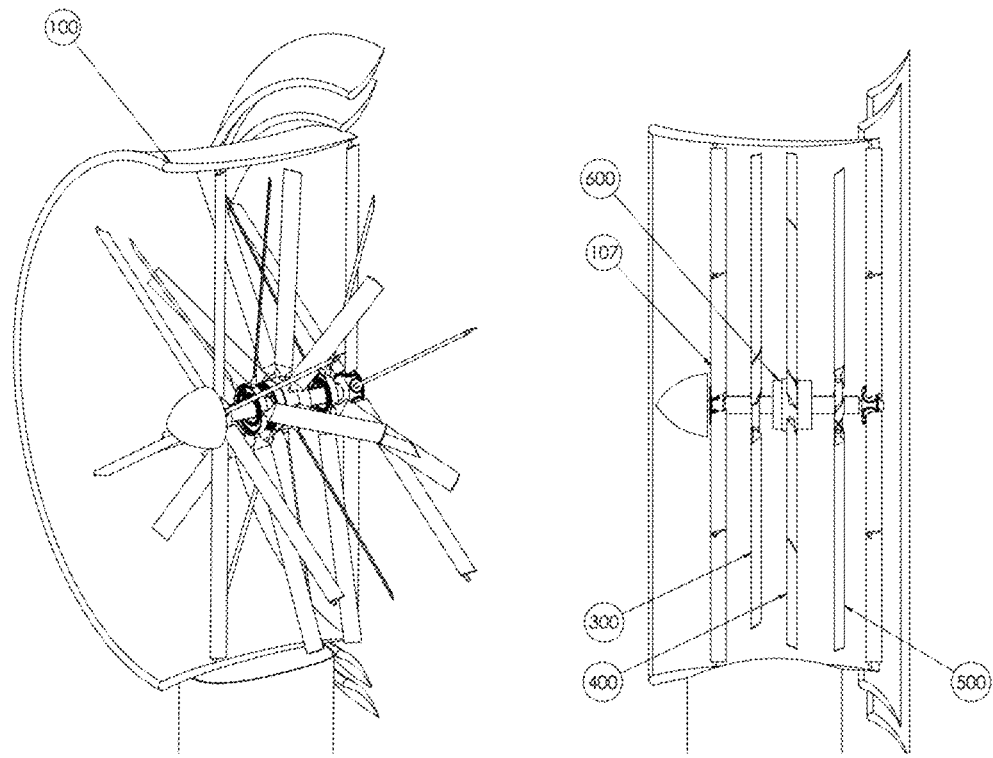
FIG. 5 is a representation of a sectional view of duct, counter-rotating generator, two rows of stators, and three groups of blades, in accordance with an embodiment.
Figure 6:
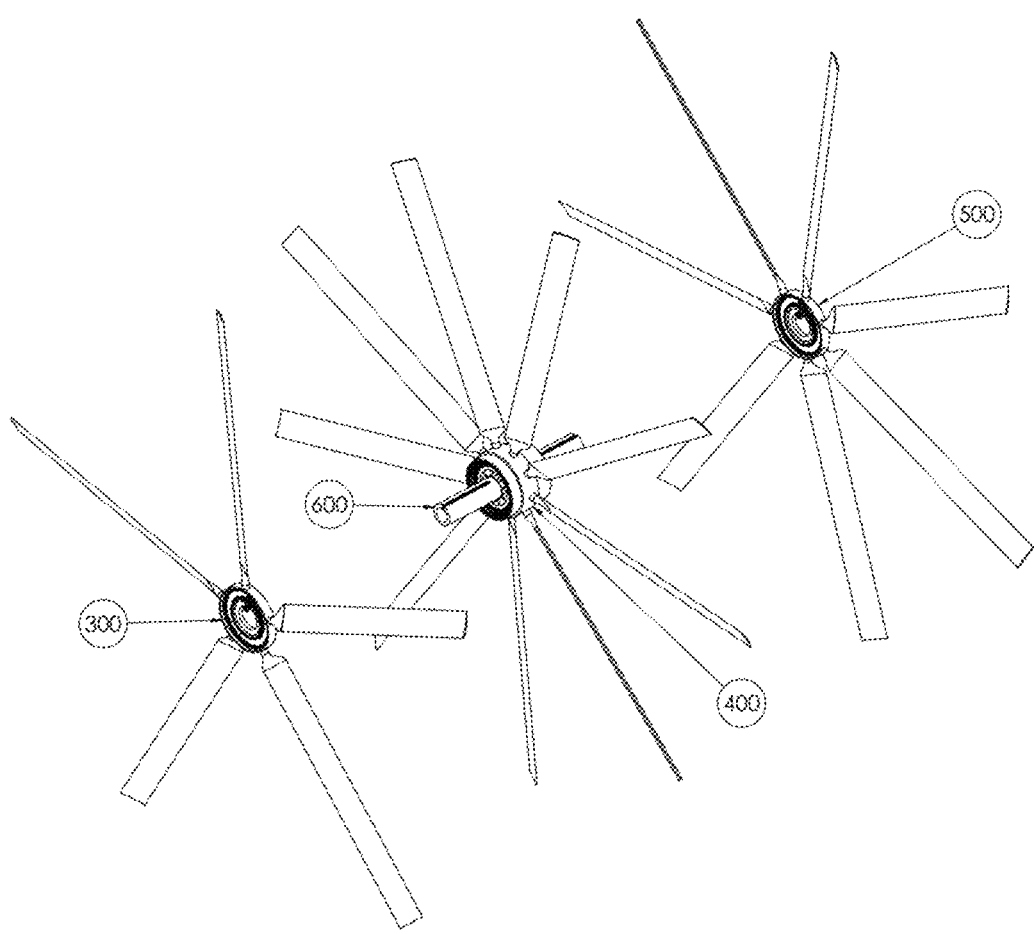
FIG. 6 is a representation of an exploded view of front rotor, middle rotor, counter rotating generator and rear rotor, in accordance with an embodiment.

FIG. 5 and FIG. 6 illustrate three groups of blades including a front group of blades (300), a middle group of blades (400), and a rear group of blades (500). The three groups of blades are located in between the front and the rear fixed stators group (106, 110) along an axis of the fixed central shaft (105). A counter-rotating generator (600) and the front active stator group (107) is shown in FIG. 5. Input airflow passes over the front active stator group (107) and in three-levels gives its energy to the airfoil blades to turn the counter-rotating generator (600). The front row of blades (300) are rotating in the same direction as the rear row of blades (500) but the middle row of blades (400) rotates in an opposite direction.

Figure 7:
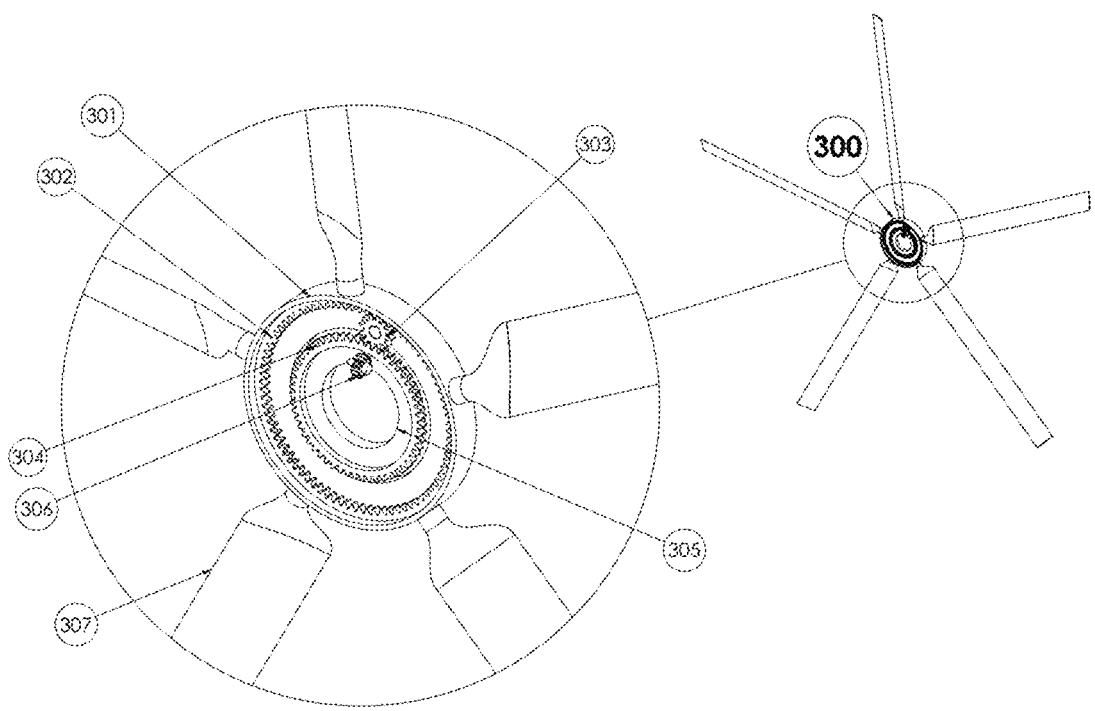
FIG. 7 is a representative perspective view of the front hub (rotor) and its components: outer ring, outer gear, inner ring, inner gear, planetary gear, pinion, and blades, in accordance with an embodiment.

In FIG. 7, a front hub (rotor) is shown that includes two main parts: an outer ring of the front rotor (301) and an inner ring of the front rotor (305). These two rotatable parts are coupled with an outer gear ring of the front rotor (302) and an inner gear ring of the front rotor (304) respectively in a planetary manner with a planetary gear of the front rotor (303). Also, all of these components are axially displaceable with a pinion gear of the front rotor (306). Due to the number of front blades (307), a pitch actuator and pitch controller can be added to this embodiment in order to alter the attack angle of the front blades (307).

Figure 8:
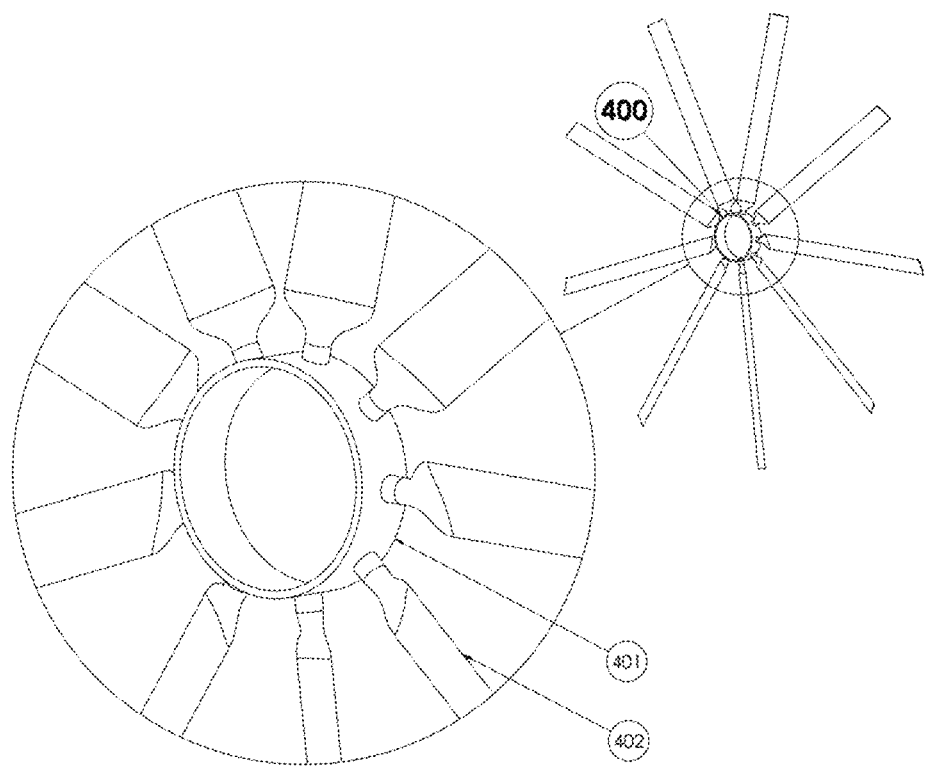
FIG. 8 is a representative perspective view of the middle hub (rotor) and its components: outer ring and blades, in accordance with an embodiment.

In FIG. 8, a middle rotor (hub) is illustrated that comprises a ring of the middle rotor (401) and blades of the middle rotor (402).

Figure 9:
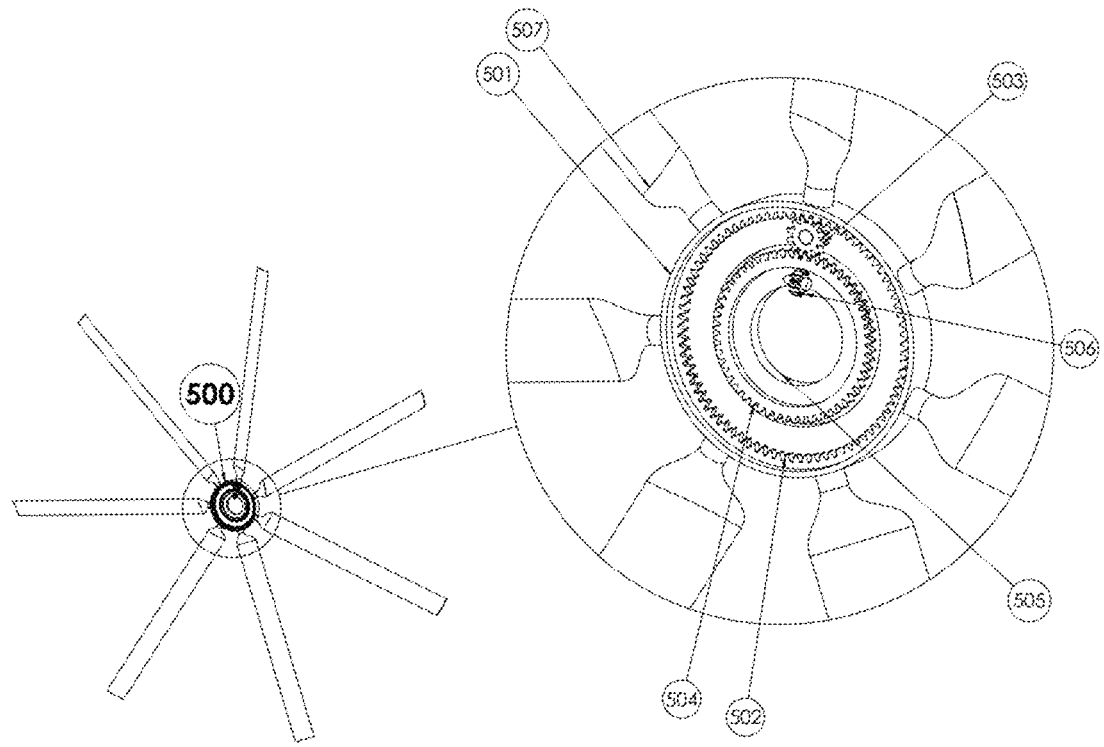
FIG. 9 is a representative perspective view of the rear hub (rotor) and its components: outer ring, outer gear, inner ring, inner gear, planetary gear, pinion, and blades, in accordance with an embodiment.

FIG. 9 shows the rear rotor (hub) that is similar to the front rotor, so that an outer ring of the rear rotor (501) and an inner ring of the rear rotor (505) are co-axially arranged. These two rotatable parts are coupled with an outer gear ring of the rear rotor (502) and an inner gear ring of the rear rotor (504) respectively and are in a planetary manner with the planetary gear of the rear rotor (503). Also, all of these components are axially displaceable with a pinion gear of the rear rotor (506). Due to the number of rear blades (507), a pitch actuator and pitch controller can be added to this embodiment in order to alter the attack angle of the rear blades (507).

Figure 10:
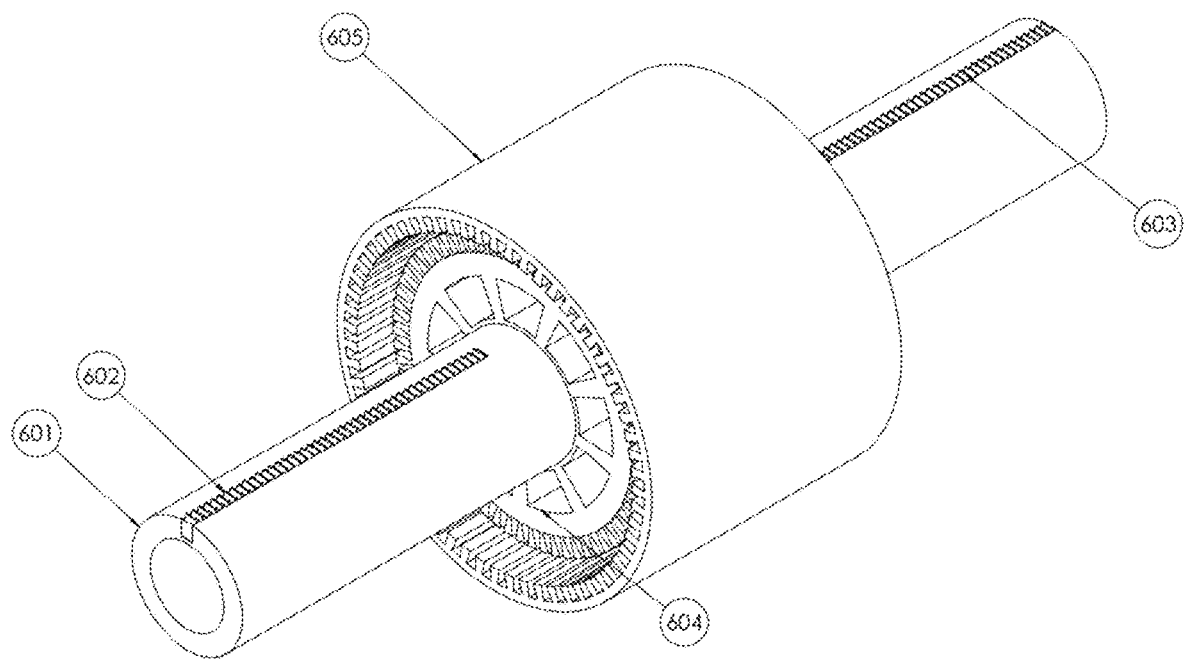
FIG. 10 is a representative perspective view of counter rotating generator and its components, in accordance with an embodiment.

FIG. 10 depicts the counter-rotating generator (600) that has an outer rotary part of the generator (605) and an inner rotary part of the generator (604) revolving in opposite directions to each other and creating electricity. A hollow shaft (601) is coupled with the inner rotary part of the generator (604) and supported about the fixed central shaft (105). This shaft (601) has two rows of rack gears in front (602) and rear (603) that allow the possibility of axial movement of both the front group of blades (300) and the rear group of blades (500). The front rack gear (602) is a path along a length of the inner shaft (601). The pinion gear (306) of the front rotor (306), equipped with an electromechanical actuator, can move on the front rack gear (602). Similar to the front rack gear (602), the rear rack gear (603) can facilitate the moving ability of the pinion gear (506) of the rear rotor (506) with an electromechanical actuator.

Figure 11A:
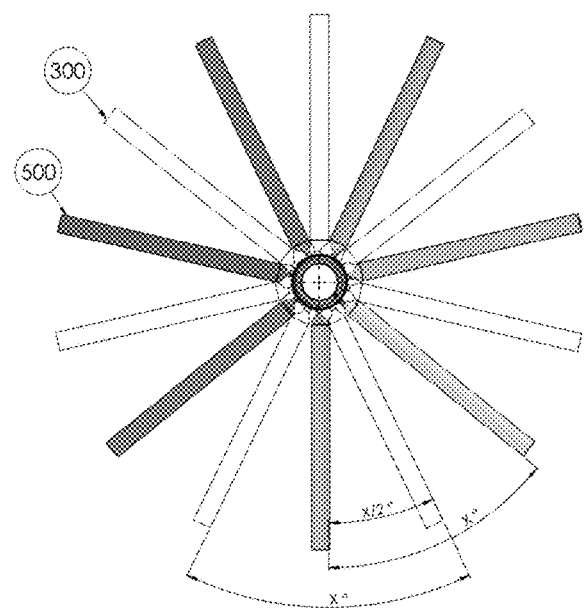
FIG. 11A is a representation of the front view of front and rear blades group with equal (seven) blades and constant (X/2) degrees differences in front and rear, in accordance with an embodiment.
Figure 11B:
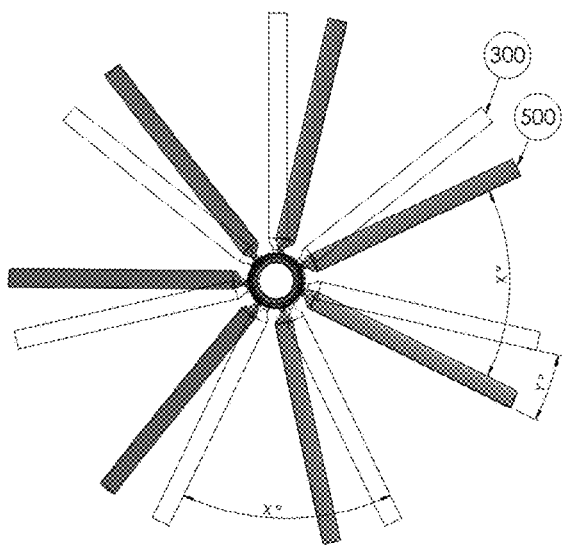
FIG. 11B is a representation of the front view of the front and rear blades group with equal (seven) blades and constant (Y) degrees differences in front and rear, in accordance with an embodiment.
Figure 12A:
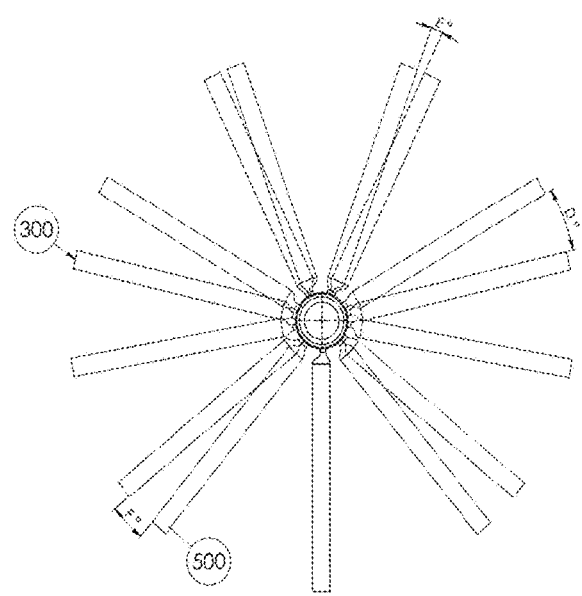
FIG. 12A is a representation of the front view of both front and rear blades group with unequal blades (seven and nine respectively) with inconstant degrees differences, in accordance with an embodiment.
Figure 12B:
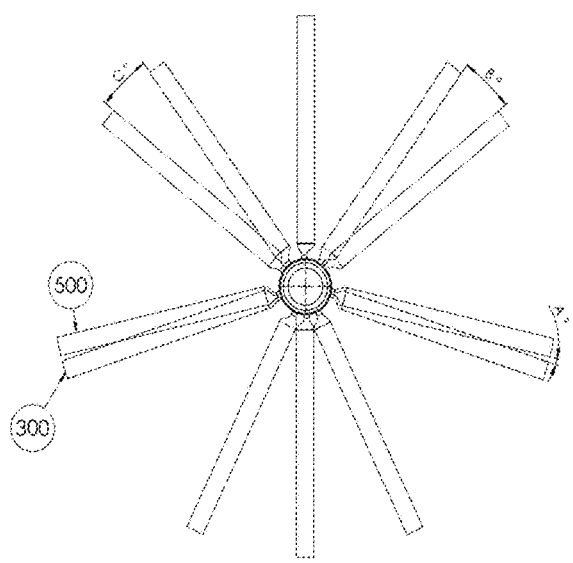
FIG. 12B is a representation of the front view of both front and rear blades group with unequal blades (five and seven respectively) with inconstant degrees differences, in accordance with an embodiment.

FIG. 11A and FIG. 11B, illustrates the blade position in the front rotor (front group of blades (300)) and rear rotor (rear group of blades (500)) in the exemplary case that both the front rotor (300) and the rear rotor (500) have seven blades. The planetary gear of the rear rotor (503) and the planetary gear of the front rotor (303) facilitate the decreasing and increasing angles of (X/2) degrees and (Y) degrees. Based on the aerodynamic condition and control system, the front blades group (300) and the rear blades group (500) will be either in a fixed or rotary position relatively to each other. FIG. 12A shows the front rotor (300) and rear rotor (500) that have seven and nine blades respectively. As depicted in FIG. 12A and in the front view of this embodiment, the front, and rear blades are in unequal blades configuration and the optimal position is when one or at most two blades of different rotors are in tandem with each other. The blades (3, 5, 7, 9, 11, etc.) in each group can be pitched automatically or manually to change the attack angle of their airfoil sections.

While this invention has been illustrated in detail and shown in drawing examples, the aim of invention described by following claims.

What is claimed is:

1. A wind turbine, comprising:
   a tower;
   a duct surrounding rotary blades, the duct disposed on the tower;
   a counter-rotating generator for producing electricity;
   the rotary blades comprising three groups of blades including front, middle and rear groups of blades;
   the front group of blades comprises a front hub from which front blades extend radially;
   the rear group of blades comprises a rear hub from which rear blades extend radially;
   the middle group of blades comprises a middle hub from which middle blades extend radially;
   the front and rear hubs are mounted to a first rotary part of the counter-rotating generator;
   the middle hub is mounted to a second rotary part of the counter rotating generator;
   the first and second rotary part rotate in an opposite sense to one another in order for the counter rotating generator to produce electricity;
   the front hub is axially movable along the first rotary part;
   the rear hub is axially movable along the first rotary part;
   the front hub includes inner and outer rings that are rotatable relative to one another to select a circumferential position of the front blades relative to the rear blades;
   the rear hub includes inner and outer rings that are rotatable relative to on another to select a circumferential position of the front blades relative to the rear blades;
   the front hub includes inner and outer rings that are rotatable relative to one another via a planetary gear arrangement;
   the rear hub includes inner and outer rings that are rotatable relative to one another via a planetary gear arrangement;
   the front blades are rotatable around their own axis to change an angle of attack thereof;
   the rear blades are rotatable around their own axis to change an angle of attack thereof; and
   the middle blades are rotatable around their own axis to change an angle of attack thereof.

2. The wind turbine of claim 1, wherein the duct has a high slope region and a non-rotary nose cone to accelerate and compress inlet airflow.

3. The wind turbine of claim 1, wherein the duct has a low slope region for decelerating the airflow through rotor passages provided by the three groups of blades.

4. The wind turbine of claim 1, wherein the duct comprises an active or fixed diffuser region for controlling outlet airflow, comprising: at least one of:
   a fixed diffuser; and
   one or more controllable diffusers;
   the diffuser operable to create pressure drop on an outlet side of the duct.

5. The wind turbine of claim 1, wherein the duct comprises a front fixed stator and a rear fixed stator located, respectively, in front and in rear of the three groups of blades.

6. The wind turbine of claim 5, wherein the front fixed stator and the rear fixed stator include bevel gear arrangement to change the angle of attack of the stator vanes to regulate airflow.

7. The wind turbine of claim 1, wherein the first rotary part is an inner rotary part that is operable as an inducer part or an induced part.

8. The wind turbine of claim 1, wherein the second rotary part is an outer rotary part that that is operable as an inducer part or an induced part.

9. The wind turbine of claim 1, wherein the first rotary part comprises at least one rack gear to facilitate the axial movement of at least one of the front and rear groups of blades.

10. The wind turbine of claim 1, wherein the front group of blades comprises a pinion gear to change an axial position the axial movement thereof along a main shaft the first rotary part of the counter-rotating generator.

11. The wind turbine of claim 1, wherein the front group of blades comprises 3, 5, 7 or 9 blades.

12. The wind turbine of claim 1, wherein the rear group of blades comprises a pinion gear to change the axial movement thereof along the first rotary part of the counter-rotating generator.

13. The wind turbine of claim 1, wherein the rear group of blades comprises 3, 5, 7 or 9 blades.

14. The wind turbine of claim 1, wherein the middle group of blades comprises 3, 5, 7 or 9 blades.

* * * * *